(12) United States Patent
Kitabayashi et al.

(10) Patent No.: US 6,374,281 B1
(45) Date of Patent: Apr. 16, 2002

(54) ADDER

(75) Inventors: Shinji Kitabayashi, Yokohama; Kazutaka Nogami, Ichikawa, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/258,819

(22) Filed: Feb. 26, 1999

(30) Foreign Application Priority Data

Mar. 3, 1998  (JP) .......................................... 10-050508

(51) Int. Cl.$^7$ .............................. G06F 7/50; G06F 7/52

(52) U.S. Cl. ........................................ 708/670; 620/709

(58) Field of Search ............................... 708/210, 211, 708/209, 205, 620, 625, 626, 628, 629, 708, 709; 341/160

(56) References Cited

U.S. PATENT DOCUMENTS

| | | | | | |
|---|---|---|---|---|---|
| 4,887,084 | A | * | 12/1989 | Yamaguchi | .................. 341/160 |
| 5,978,827 | A | * | 11/1999 | Ichikawa | .................... 708/709 |
| 6,058,403 | A | * | 5/2000 | Vijayrao et al. | ............ 708/211 |

* cited by examiner

*Primary Examiner*—Chuong Dinh Ngo
(74) *Attorney, Agent, or Firm*—Oblon, Spivak, McClelland, Maier & Neustadt, P.C.

(57) ABSTRACT

An adder comprises: a comparator circuit 2 for comparing values of n input signals, each of which comprises 1-bit data, with first to n-th predetermined values which are different from each other; a non-volatile memory 6 having first to n+1-th word lines, m ($2^m \geq n+1$) bit lines which are provided so as to intersect the word lines, and memory cells, each of which is provided at an intersection of each of the word lines and each of the bit lines and each of which has stored 1-bit data; and a selector circuit 4 for selecting one of the n+1 word lines on the basis of n comparison results of the comparator circuit to activate the selected word line. Thus, a plurality of bits are added at high speed.

4 Claims, 12 Drawing Sheets

ADDER

BACKGROUND OF THE INVENTION

1. Field of the Invention

The present invention relates generally to an adder for adding a plurality of bits. More specifically, the invention relates to an adder for adding partial products at the same place in multiplication.

2. Description of the Related Art

Conventionally, an array type parallel multiplication system is used when a n-bit multiplicand X ($=X_{n-1}2^{n-1}+\ldots +X_{1}2+X_{0}$) and a n-bit multiplier Y ($=Y_{n-1}2^{n-1}+\ldots +Y_{1}2+Y_{0}$) are multiplied together. In this array type parallel multiplication system, $n^2$ AND gates are used to multiply each of bit values $X_i$ ($i=0,\ldots, n-1$) of the multiplicand X by each of bit values $Y_j$ ($j=0,\ldots, n-1$) of the multiplier Y to derive partial products $P_{ij}(=X_i \cdot Y_j)$, which are added in each place. For the addition of the partal products, arrayed full adders are used, and carry signals over the partial products are ripple carry connections.

Thus, in the array type multiplication system, the arrayed full adders are used for adding the partial products, and the carry signals over the partial products are the ripple carry connections. Therefore, it is not possible to add its own place unless a carry signal is received from a full adder of a lower place by 1. This is much problem to accelerate operation.

SUMMARY OF THE INVENTION

It is therefore an object of the present invention to eliminate the aforementioned problems and to provide an adder capable of adding a plurality of bits at high speed.

In order to accomplish the aforementioned and other objects, according to one aspect of the present invention, an adder comprises: comparing means for comparing values of n input signals, each of which comprises 1-bit data, with first to n-th predetermined values which are different from each other; a non-volatile memory having first to n+1-th word lines, m ($2^m \geq n+1$) bit lines which are provided so as to intersect the word lines, and memory cells, each of which is provided at an intersection of each of the word lines and each of the bit lines and each of which has stored 1-bit data; and selecting means for selecting one of the n+1 word lines on the basis of n comparison results of the comparing means to activate the selected word line.

The non-volatile memory may store predetermined data in each of the memory cells connected to the i-th ($i=1,\ldots, n+1$) word line, and output m-bit data indicative of a binary number corresponding to i−1 via the first to m-th bit lines when the i-th word line is selected.

The i-th ($i=1,\ldots, n$) predetermined value may be greater than i−1 and less than i, and the comparing means has first to n-th comparators, the i-th ($i=1,\ldots, n$) comparator determining whether the number of input signals having a truth value of 1 out of the n input signals exceeds the first predetermined value, and outputting a i-th comparison result indicative signal, and the selecting means selecting one of the word lines on the basis of the first to n-th comparison result indicative signals.

The selecting means may have a first inverting gate for inverting the first comparison result indicative signal to output an inverted signal to the first word line, and a second inverting gate for inverting the inverted signal of the n-th comparison result indicative signal to output an inverted signal to the n+1-th word line, and the i-th ($i=1,\ldots, n-1$) NOR gate may carry out a NOR operation on the basis of the inverted signal of the i-th comparison result indicative signal and the i+1-th comparison result indicative signal to output an operation result to the i+1-th word line.

The i-th ($i=1,\ldots, n$) comparator may comprise: first and second transistors of a first conductive type, each of the first and second transistors having a source, to which a first power supply voltage is applied; a third transistor of a second conductive type which is different from the first conductive type, the third transistor having a drain connected to a drain of the first transistor, and a gate connected to a gate of the first transistor and a drain of the second transistor; a fourth transistor of the second conductive type, the fourth transistor having a drain connected to the drain of the second transistor, and a gate connected to a gate of the second transistor and the drain of the first transistor; a fifth transistor of the second conductive type, the fifth transistor having a source connected to a second power supply voltage which is different from the first power supply voltage, and a gate for receiving an enable signal from the outside; a first transistor group including i transistors of the second conductive type, which are connected in parallel between a source of the third transistor and a drain of the fifth transistor, each of the i transistors having a gate, to which the first power supply voltage is applied; and a second transistor group including n transistors of the second conductive type, which are connected in parallel between a source of the fourth transistor and the drain of the fifth transistor, and wherein a j-th ($j=1,\ldots, n$) input signal out of the n input signals is applied to a gate of a j-th transistor of the second transistor group, each of the n transistors of the second transistor group having the same current driving ability, one of the i transistors of the first transistor group having a current driving ability which is less than that of each of the n transistors of the second transistor group if i=1, each of transistors other than the one of the i transistors of the first transistor group having a current driving ability which is equal to that of each of the n transistors of the second transistor group and which is greater than that of the one of the i transistors of the first transistor group if i≠1, and the i-th comparison result indicative signal being outputted from the drain of the first transistor, and an inverted signal of the i-th comparison result indicative signal being outputted from the drain of the second transistor.

According to another aspect of the present invention, a multiplier includes at least one adder comprising: comparing means for comparing values of n input signals, each of which comprises 1-bit data, with first to n-th predetermined values which are different from each other; a non-volatile memory having first to n+1-th word lines, m ($2^m \geq n+1$) bit lines which are provided so as to intersect the word lines, and memory cells, each of which is provided at an intersection of each of the word lines and each of the bit lines and each of which has stored 1-bit data; and selecting means for selecting one of the n+1 word lines on the basis of n comparison results of the comparing means to activate the selected word line, and the adder is used for adding partial products at the same place.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 1:
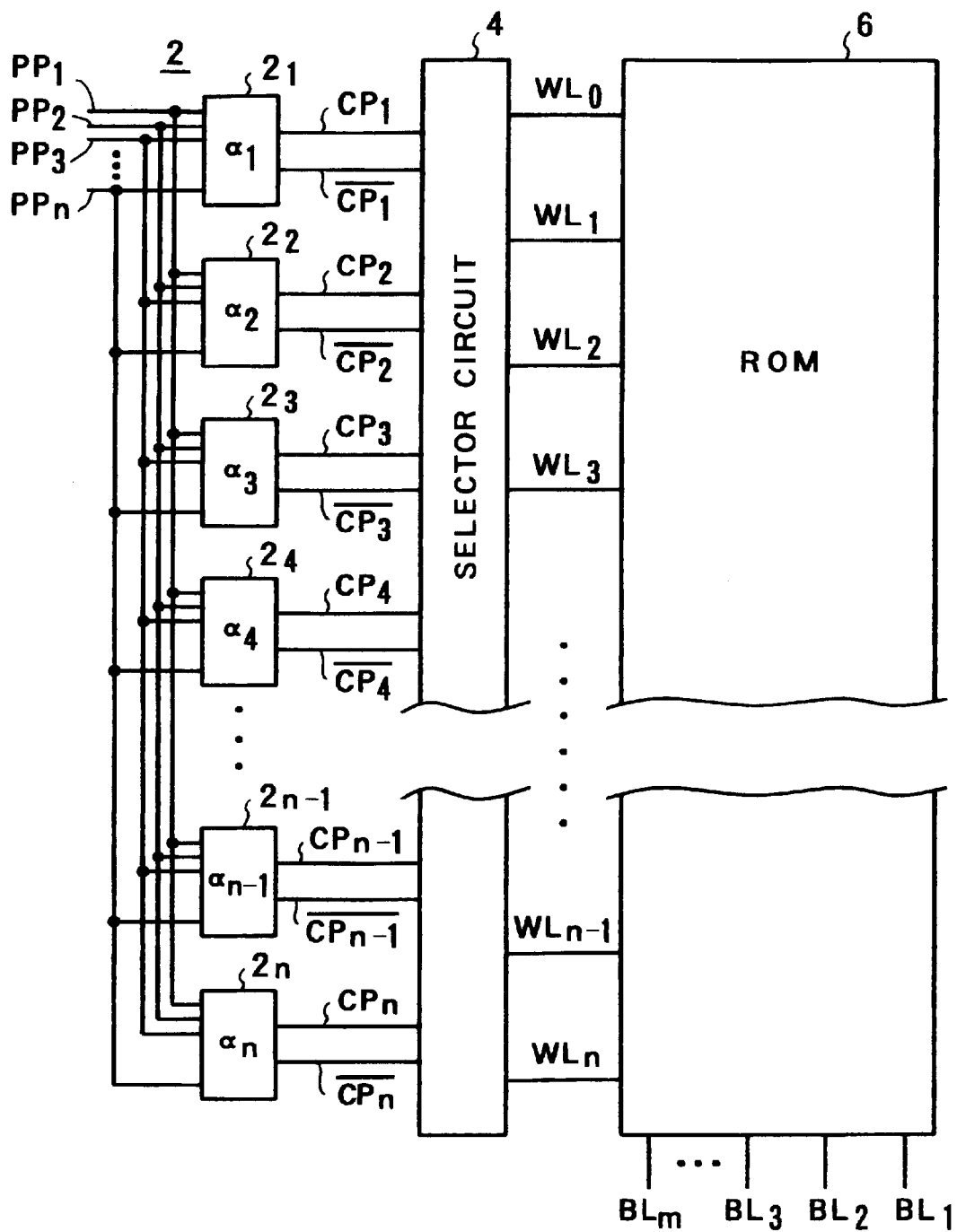
FIG. 1 is a block diagram of a preferred embodiment of an adder according to the present invention.

FIG. 1 shows a preferred embodiment of an adder according to the present invention. In this preferred embodiment, the adder comprises comparing means 2, a selector circuit 4, and a read only memory (ROM) 6.

The comparing means 2 has n comparators $2_1, \ldots, 2_n$. Each comparators $2_i (i=1, \ldots, n)$ compares whether the number of inputs having a truth value of "1" out of n inputs $PP_1, \ldots, PP_n$, each of which comprises 1-bit data, is greater than a predetermined number $\alpha_i$ (e.g., $\alpha_i=i-0.5$) on the basis of the n inputs $PP_1, \ldots, PP_n$, and outputs a signal $CP_i$ indicative of the comparison result and its inverted signal/$CP_i$. When the number of inputs having a truth value of "1" is greater than the predetermined number $\alpha_i$, it is assumed that $CP_i=1$ and /$CP_i=0$, and when the number is less than the predetermined number $\alpha_i$, it is assumed that $CP_i=0$ and /$CP_i=1$. For example, when the number of inputs having a truth value of "1" out of the n inputs $PP_1, \ldots, PP_n$ is 3, $CP_1=CP_2=CP_3=1$, /$CP_1$=/$CP_2$=/$CP_3=0$, $CP_4= \ldots =CP_n=0$, and /$CP_4= \ldots$ / $CP_n=1$.

Therefore, the comparing means 2 is designed to compare the number of inputs having a truth value of "1" out of the n inputs $PP_1, \ldots, PP_n$ with n different predetermined values $\alpha_1, \ldots, \alpha_n$. The predetermined value $\alpha_i$ is, e.g., $\alpha_i=0.5\times(2\cdot i-1)$.

Figure 2:
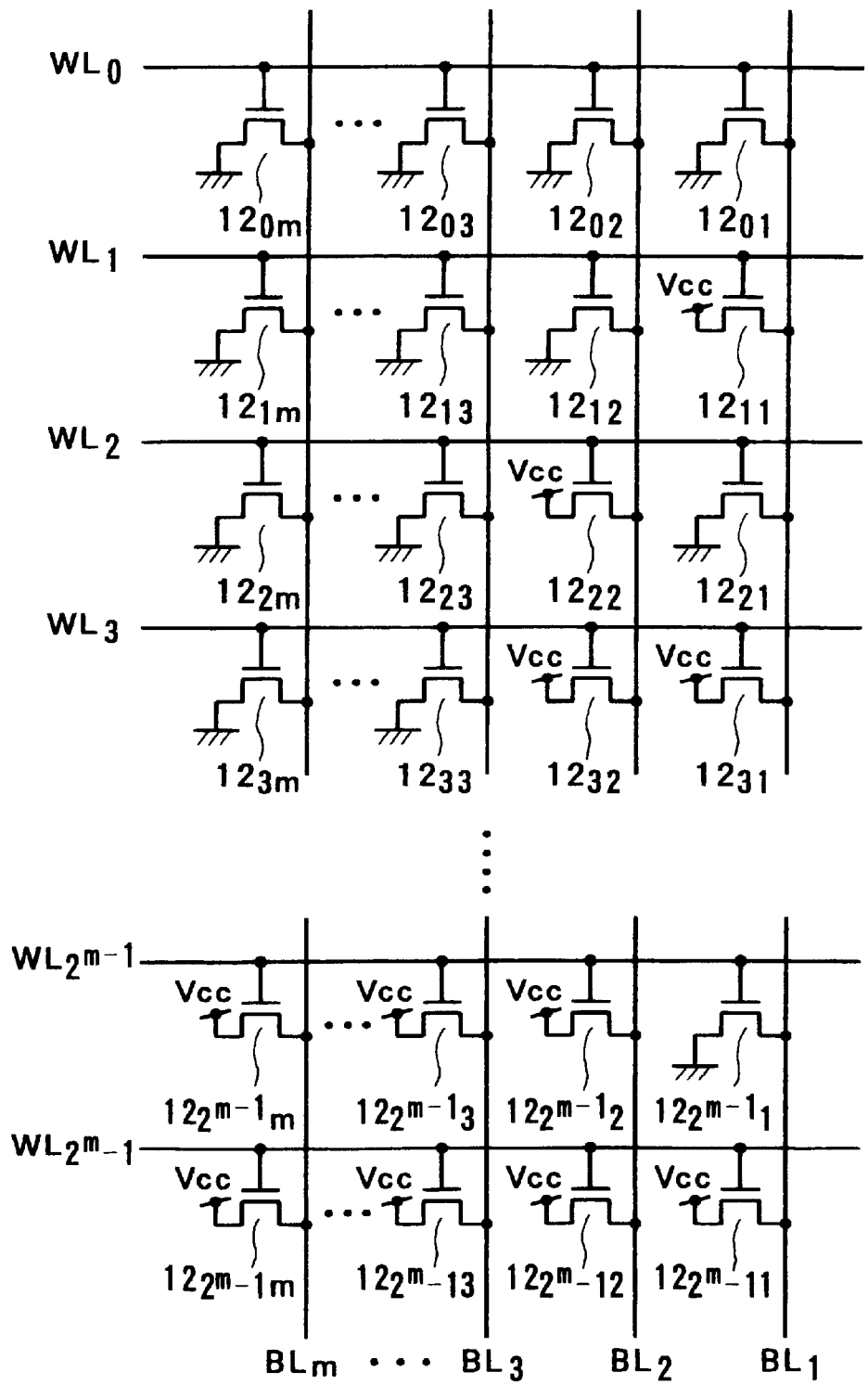
FIG. 2 is a circuit diagram of an embodiment of a ROM of an adder according to the present invention.

The ROM 6 has n+1 word lines $WL_0, \ldots, WL_n$, m bit lines $BL_1, \ldots, BL_m$, and (n+1)×m memory cells (not shown), each of which is provided at the intersection of each of the word lines and each of the bit lines. The ROM 6 is designed to store data in the memory cells so that a bit value at a place of number j (j=1, ..., m) from the least significant of a binary number of a number "i" is outputted from the bit line $BL_j$ when a word line $WL_i$ (i=0, ..., n) is selected from the n+1 word lines $WL_0, \ldots, WL_n$. FIG. 2 shows an embodiment of the ROM 6 when $n=2^m-1$. Near the intersection of each of the word line $WL_i$ (i=0, ..., $2^m-1$) and each of the bit line $BL_j$ (j=1, ..., m) of the ROM 6, an N-channel MOS transistor $12_{ij}$ forming a memory cell is provided. The gate of the transistor $12_{ij}$ is connected to the word line $WL_i$. One of the source and drain of the transistor $12_{ij}$ is connected to the bit line $BL_j$, and the other is connected to a power supply Vcc or a ground power supply GND. In FIG. 2, when the word line $WL_3$ is selected, signals of "H" level, i.e., signals having a truth value of "1", are outputted from the bit lines $BL_1$ and $BL_2$, and signals of "L" level, i.e., signals having a truth value of "0", are outputted from other bit lines $BL_3, \ldots, BL_m$. Therefore, when the word line $WL_3$ is selected, a binary number 00 ... 011 of m figures indicative of a decimal number "3" is outputted from the bit lines $BL_1, \ldots, BL_m$. Furthermore, m meets a condition $2^m \geq n$.

The selector circuit 4 selects one word line from the n+1 word lines $WL_0, \ldots, WL_n$ of the ROM 6 on the basis of the output of the comparing means 2. The selector circuit 4 selects and activates the word line $WL_i$ when the number of inputs having a truth value of "1" out of the n inputs $PP_1, \ldots, PP_n$ of the comparing means 2 is i.

In the adder with the above described construction, if n inputs $PP_1, \ldots, PP_n$ wherein the number of inputs having a truth value of "1" is i (i≦n) are fed from the outside, the comparators $2_1, \ldots, 2_i$ output comparison result indicative signals wherein $CP_1= \ldots =CP_i=1$ and/ $CP_1= \ldots =/ CP_i=0$, and the comparators $2_{i+1}, \ldots, 2_n$ output comparison result indicative signals wherein $CP_{i+1}= \ldots =CP_n=0$ and/$CP_{i+1}= \ldots =/ CP_n=1$. On the basis of these comparison result indicative signals, the selector circuit 4 selects one word line $WL_i$ from the n+1 word lines $WL_0, \ldots, WL_n$ of the ROM 6, and activates only the selected word line $WL_i$. Thus, data indicative of a binary number corresponding to a decimal number "i" are outputted from the memory cells of the ROM 6, which have been connected to the word line $WL_i$, via the bit lines $BL_1, \ldots, BL_m$. This indicates that the addition results of the n inputs $PP_1, \ldots PP_n$ are outputted from the ROM 6.

Figure 3:
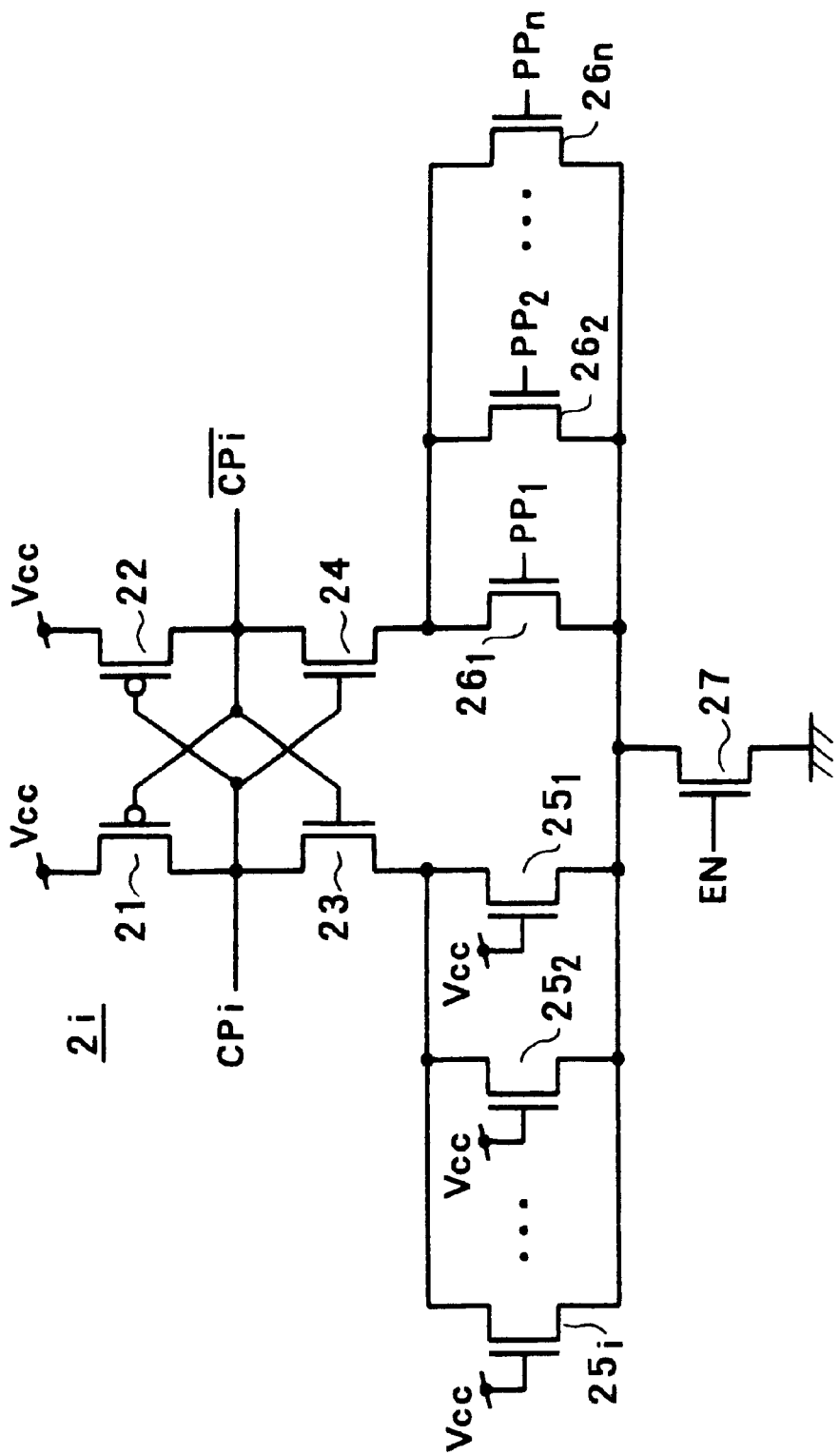
FIG. 3 is a circuit diagram of an embodiment of a comparator of an adder according to the present invention.

FIG. 3 shows an embodiment of each comparator $2_i$ (i=1, ..., n) of the above described adder. In this embodiment, the comparator $2_i$ comprises P-channel MOS transistors 21, 22, N-channel MOS transistors 23, 24, i N-channel MOS transistors $25_1, \ldots, 25_i$, n N-channel MOS transistors $26_1, \ldots, 26_n$, and an N-channel MOS transistor 27.

The drains of the transistors 21 and 23 are commonly connected, and a power supply voltage Vcc is applied to the source of the transistor 21. The drains of the transistors 22 and 24 are commonly connected, and a power supply voltage Vcc is applied to the source of the transistor 22. The gates of the transistors 21 and 23 are connected to the drain of the transistor 22, and the gates of the transistors 22 and 24 are connected to the drain of the transistor 21.

The source of the transistor 27 is grounded, and an enable signal EN is applied to the gate of the transistor 27 from the outside. Between the source of the transistor 23 and the drain of the transistor 27, i transistors $25_1, \ldots, 25_i$ are connected in parallel. To each of the gates of the i transistors $25_1, \ldots, 25_i$, a power supply voltage Vcc is applied.

Between the source of the transistor 24 and the drain of the transistor 27, n transistors $26_1, \ldots, 26_n$ are connected in parallel. To the gate of each transistor $26_j$(j=1, ..., n), an input signal $PP_j$ is applied.

From the commonly connected drain ends of the transistors 21 and 23, an output signal $CP_i$ is outputted. From the commonly connected drain ends of the transistors 22 and 24, an inverted signal $/CP_i$ of the signal $CP_i$ is outputted.

In the comparator $2_i$, each of current driving abilities of the transistors $25_2, \ldots, 25_i$ and the transistors $26_1, \ldots, 26_n$ is set to be 1 assuming that the current driving ability of the transistor $25_1$ is 0.5.

In the comparator $2_i$, when the level of the enable signal EN is changed from "0" level to "1" level while the n inputs $PP_2, \ldots, PP_n$ are inputted, the transistor 27 is turned ON, so that the potential of the drain of the transistor 27 reduces. Then, the potential of the source of the transistor 23 also reduces since the transistors $25_1, \ldots, 25_i$ are always in ON state. In addition, since a transistors $26_j$, to the gate of which an input signal $PP_j$ having a truth value of 1 is inputted, out of the n transistors $26_1, \ldots, 26_n$ is in ON state, the potential of the source of the transistor 24 also reduces.

On the basis of the number β of input signals having a truth value of "1" out of the n input signals $PP_1, \ldots, PP_n$, it is determined which of the potentials of the sources of the transistors 23 and 24 reduces earlier.

Now, assuming that β<i, the number of transistors, which are in ON state, out of the n transistors $26_1, \ldots, 26_n$ is β. Therefore, at this time, the current flowing through the parallel circuit comprising the n transistors $26_1, \ldots, 26_n$ is β (=β×1). On the other hand, the current flowing through the parallel circuit comprising the i transistors $25_1, \ldots, 25_i$ is i−0.5 (=(i−1)×1+0.5). Thus, the current flowing through the parallel circuit comprising the i transistors $25_1, \ldots, 25_i$ is greater than the current flowing through the parallel circuit comprising the n transistors $26_1, \ldots, 26_n$, and the potential of the source of the transistor 23 reduces earlier than the potential of the source of the transistors 24. As a result, the transistor 23 is turned ON earlier than the transistor 24, and the potential of the drain of the transistor 23 reduces earlier than the potential of the drain of the transistor 24. Therefore, the transistor 22 is turned ON earlier than the transistor 21, so that the output signal $CP_i$ is "0" and the output signal $/CP_i$ is "1".

When β≧i, the source potential of the transistor 24 reduces earlier than the source potential of the transistor 23. Therefore, contrary to the case where β<i, the output signal $CP_i$ is "1", and the output signal $/CP_i$ is "0".

Figure 4:
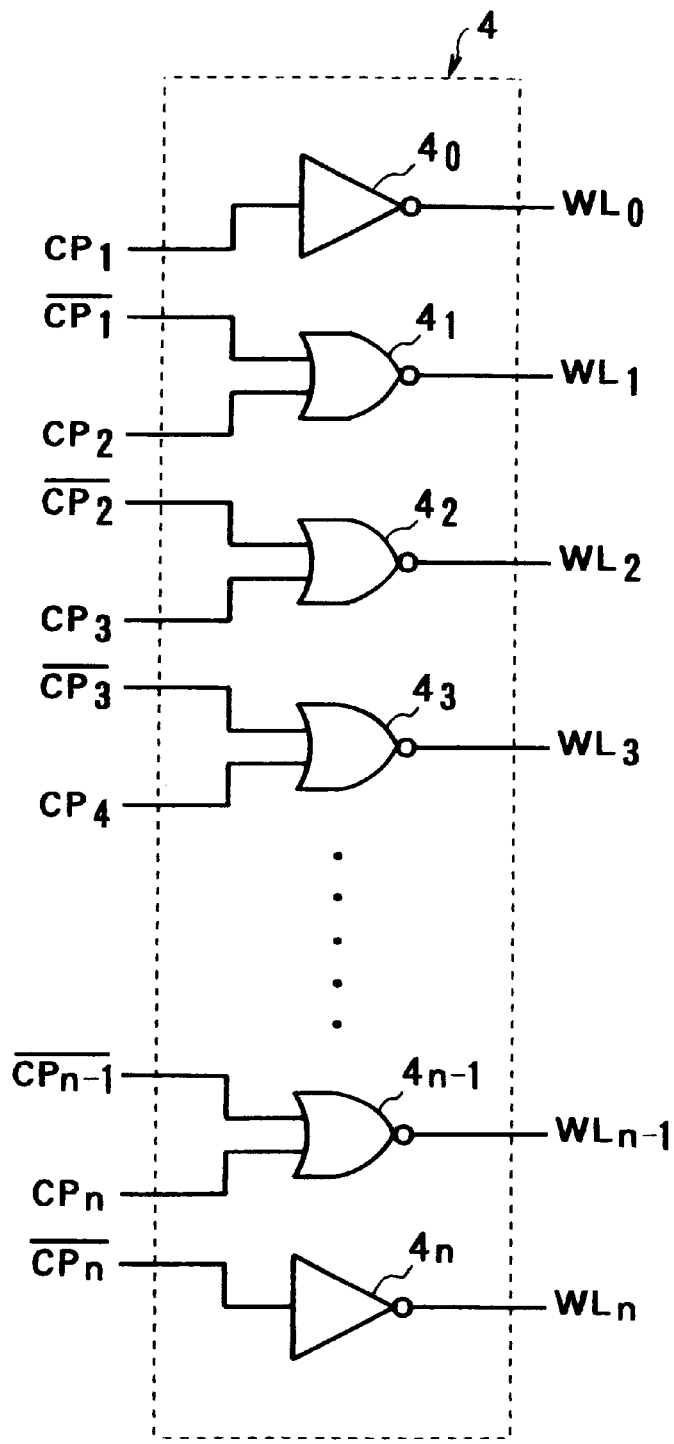
FIG. 4 is a circuit diagram of an embodiment of a selector circuit of an adder according to the present invention.

FIG. 4 shows an embodiment of the selector circuit 4 of the adder in this preferred embodiment. In this example, the selector circuit 4 comprises two inverting gates $4_0$, $4_n$, and n−1 NOR gates $4_1, \ldots, 4_{n-1}$.

The inverting gate $4_0$ receives and invert the output signal $CP_1$ of the comparator $2_1$ to output an inverted signal to the word line $WL_0$ of the ROM 6.

The NOR gate $4_i$(i=1, ..., n−1) carries out the NOR operation on the basis of the output signal $/CP_i$ of the comparator $2_i$ and the output signal $CP_{i+1}$ of the comparator $2_{i+1}$ to output the operation results to the word line $WL_i$ of the ROM 6.

The inverting gate $4_n$ receives and invert the output signal $CP_n$ of the comparator $2_n$ to output an inverted signal to the word line $WL_n$ of the ROM 6.

Now, assuming that the number of input signals having a truth value of "1" out of the n input signals $PP_1, \ldots, PP_n$ is i (0≦i≦n), $CP_1 = \ldots = CP_i=1$, $CP_{i+1} = \ldots = CP_n=0$, $/CP_1 = \ldots =/Cp_i=0$, $/CP_{i+1} = \ldots = /CP_n=1$. Therefore, only the output signal outputted from the selector circuit 4 to the word line $WL_i$ has "1", and the output signals outputted to other word lines $WL_j$ (j≠i) have "0", so that only the word line $WL_i$ is selected and activated.

Figure 5:
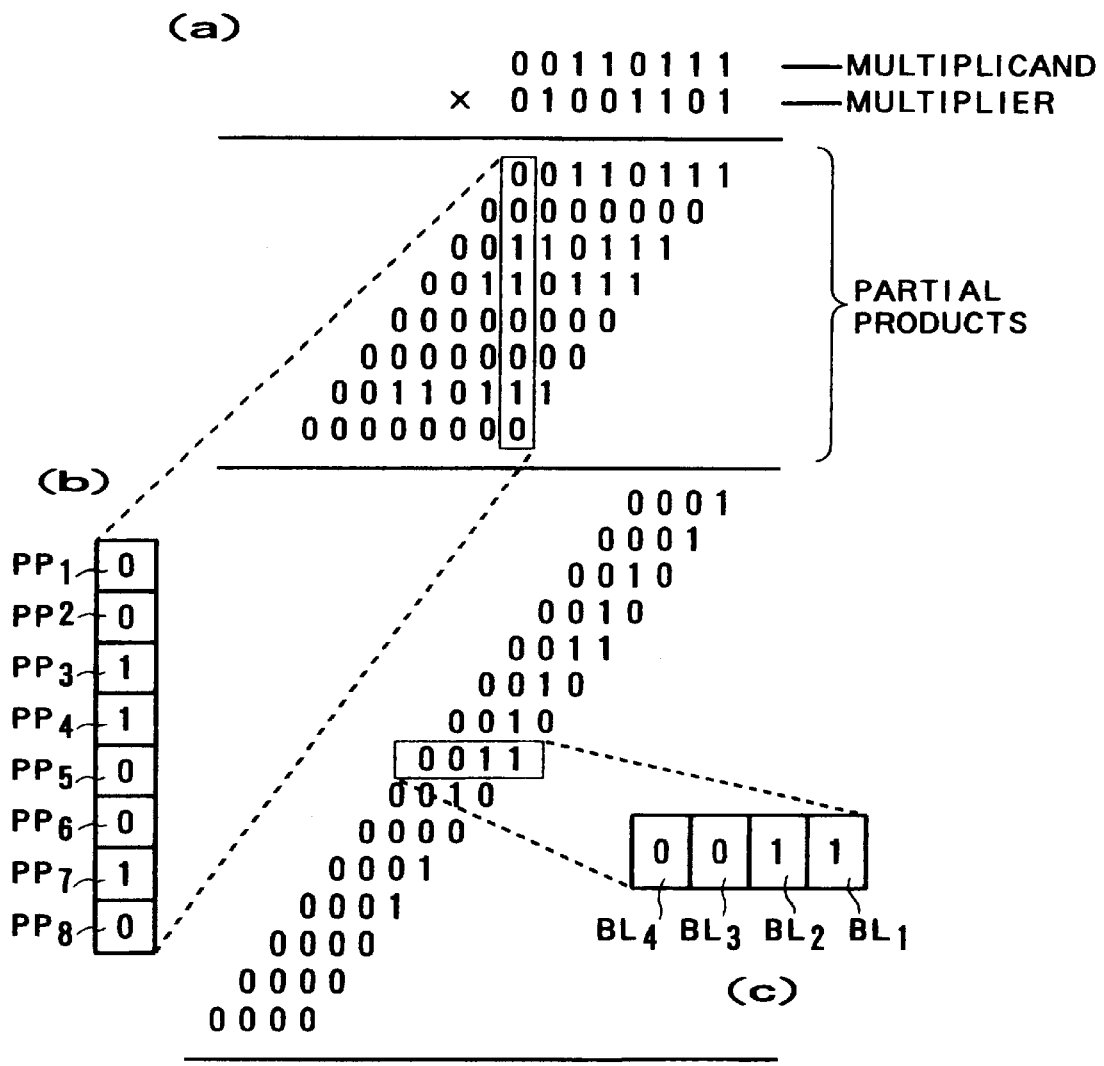
FIG. 5 is a schematic diagram showing the addition of partial products in multiplication using an adder according to the present invention.

Referring to FIG. 5, a case where the adder in this preferred embodiment is used for adding partial products at the same place in a multiplier will be described.

As shown in FIG. 5(a), a case where an 8-bit multiplicand (=00110111) is multiplied by an 8-bit multiplier (=01001101) will be considered.

First, a partial product of a bit at each place of the multiplicand by a bit at each place of the multiplier is derived. These partial products are derived by 8×8 AND gates. Considering a case where the adder in this preferred embodiment is used for adding partal products in number 8 place from the least significant, the values of the 8 input signals $PP_1, \ldots, PP_8$ of the comparing means 2 shown in FIG. 1 are $PP_1=0$, $PP_2=0$, $PP_3=1$, $PP_4=1$, $PP_5=0$, $PP_6=0$, $PP_7=0$ and $PP_8=0$ as shown in FIG. 5(b). That is, since the number of input signals having a truth value of "1" out of the 8 input signals $PP_1, \ldots, PP_8$ is "3", data (=0011) indicative of a binary number corresponding to "3" are outputted from the bit lines $BL_1$, $BL_2$, $BL_3$ and $BL_4$ of the ROM 6 (see FIG. 5(c)).

Furthermore, it is not required to use the adder in this preferred embodiment for all of the additions of partial products in multiplication, and it is desired to use a full adder for adding partial products at small places wherein the number of bits to be added is small. Therefore, it is desired to combine the adder in this preferred embodiment with a full adder for adding partial products in multiplication.

Referring to FIGS. 6 through 10, it will be described that acceleration can be achieved when the adder in this preferred embodiment (which will be hereinafter referred to as a multi-input adder) is used for adding partial products in a multiplier.

Now, it is assumed that the multiplier is a 32-bit×32-bit multiplier. In the 32-bit×32-bit multiplication, operation for partial products is first carried out. The partial products are derived by 32×32 AND gates similar to the conventional case. Then, a partial product adder, which comprises a multi-input adder and a full adder combined therewith, is used for adding partial products at the same place.

Figure 6:
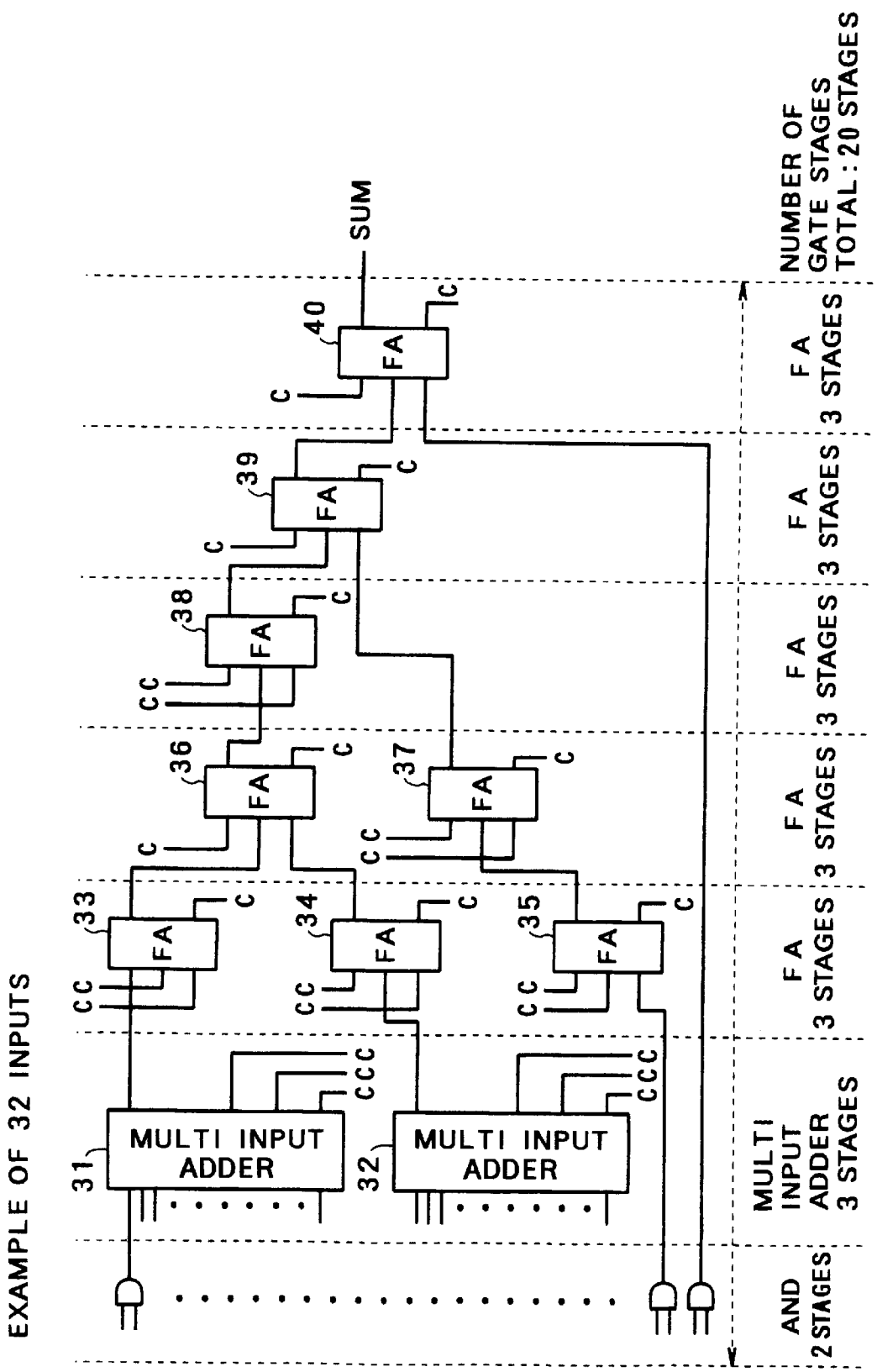
FIG. 6 is a block diagram of an embodiment of a partial product adder when the number of inputs is 32.

In a partial product adder for adding 32 partial products at a certain place when the maximum number of inputs of the multi-input adder is 15, two multi-input adders 31 and 32 are arranged in parallel as shown in FIG. 6. Each of the multi-input adders 31 and 32 receives signals from 15 AND gates, and outputs the sum signals of the places and carry signals C for carrying to upper places by 1, 2 and 3. Therefore, three full adders 33, 34 and 35 are provided in the next stage to the multi-input adders 31 and 32. Moreover, two full adders 36 and 37 are provided in the next stage to the three adders 33, 34 and 35, and a full adder 38 is provided in the next stage to the two full adders 36 and 37. In addition, a full adder 39 is provided in the next stage to the full adder 38, and a full adder 40 is provided in the next stage to the full adder 39. The full adder 40 outputs sum signals and carry signals of the places.

The number of gate stages of the partial product adder shown in FIG. 6 will be counted. First, since the AND gates for deriving partial products generally comprises NAND gates and inverting gates combined therewith, the number of the AND gate stages is 2. In addition, since the multi-input adder comprises the comparing means 2, the selector circuit 4 and the ROM 6 as shown in FIG. 1, the number of gate states of the multi-input adder is 3. Moreover, the number of gate stages of the full adder is generally 3. Therefore, the number of gate stages of the partial product adder shown in FIG. 6 is 20 (=2+3×6) at the maximum (see FIG. 6).

Figure 7:
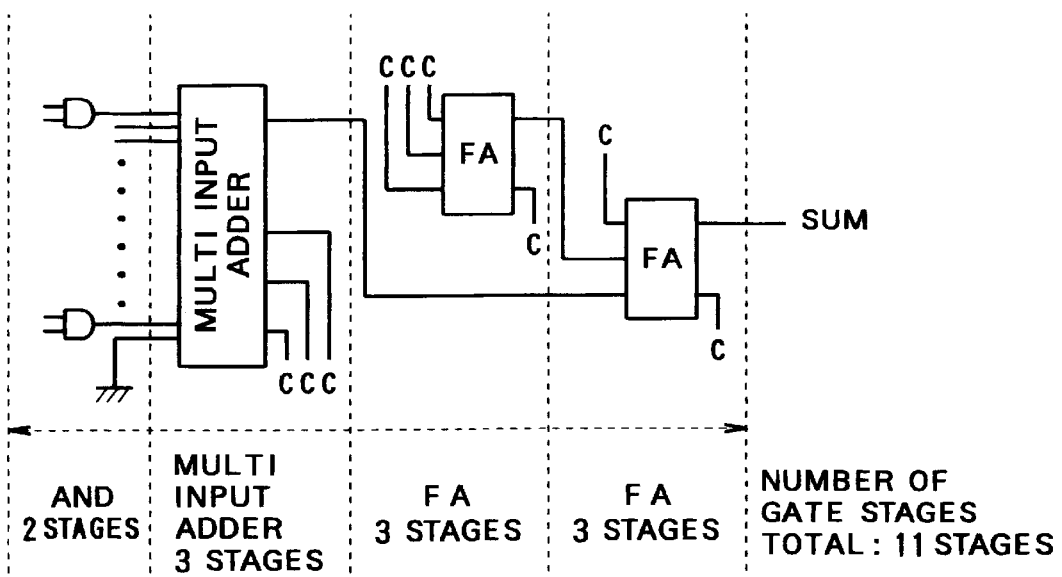
FIG. 7 is a block diagram of an embodiment of a partial product adder when the number of inputs is 14.

FIGS. 7 through 10 show embodiments of partial product adders wherein the number of partial products to be added (the number of inputs) is less than 15. FIG. 7 is a block diagram of an embodiment of a partial product adder wherein the number of inputs is 14, the partial product adder comprising a multi-input adder, wherein the number of inputs is 15, and two full adders. The number of gate stages of the partial product adder shown in FIG. 7 is 11 at the maximum.

Figure 8:
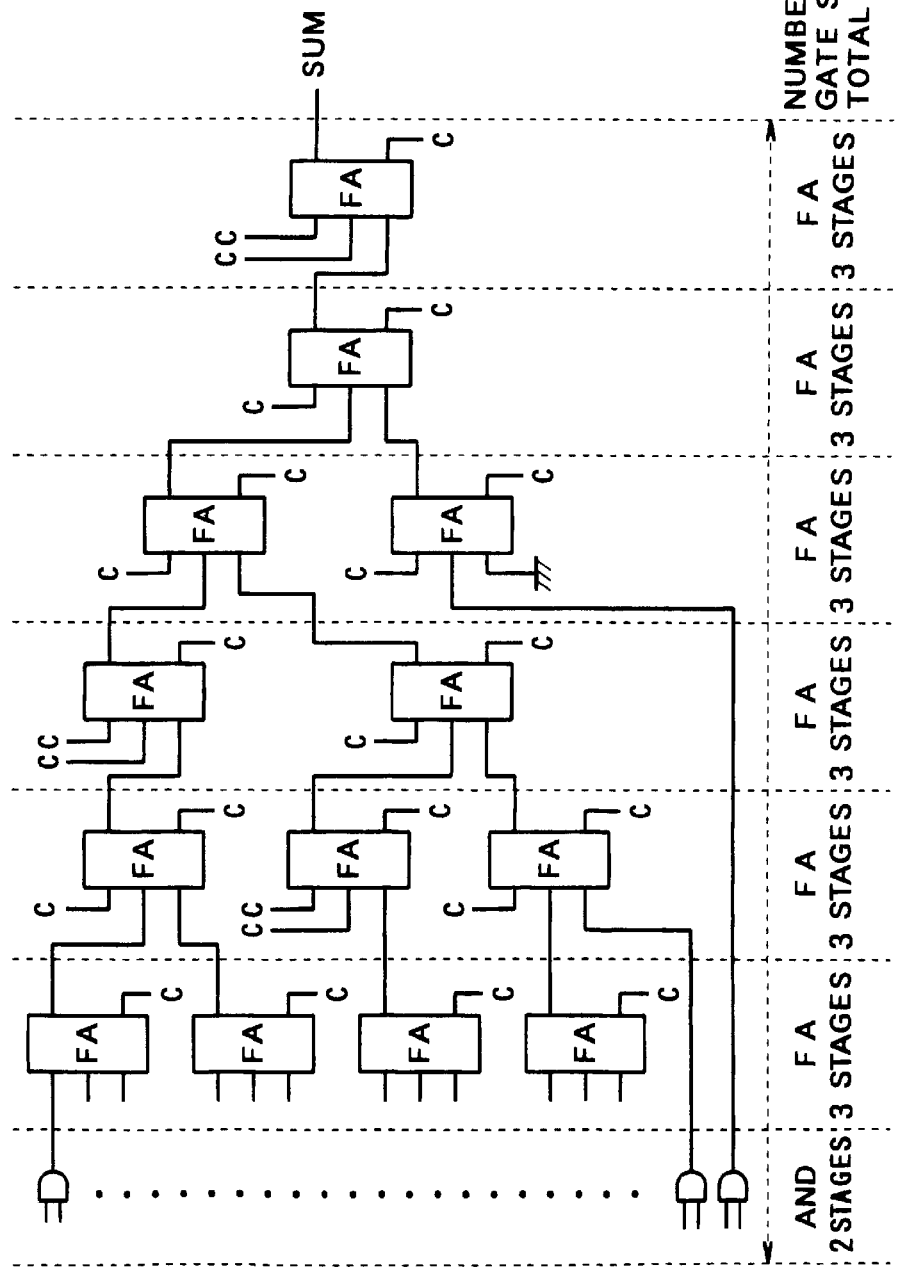
FIG. 8 is a block diagram of another embodiment of a partial product adder when the number of inputs is 14.

FIG. 8 shows an embodiment of a partial product adder wherein the number of inputs is 14, the partial product adder comprising only full adders. The partial product adder shown in FIG. 8 comprises 13 full adders, and the number of gate stages is 20 at the maximum.

Figure 9:
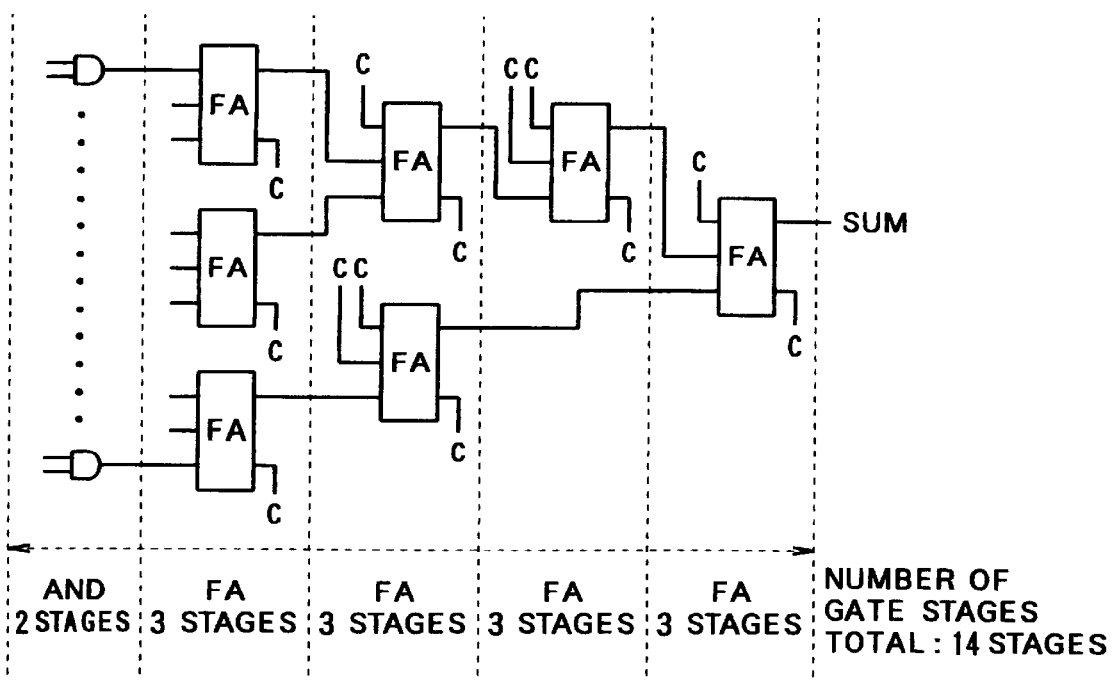
FIG. 9 is a block diagram of an embodiment of a partial product adder when the number of inputs is 9.

FIG. 9 shows an embodiment of a partial product adder wherein the number of inputs is 9. In this embodiment, the partial product adder comprises 7 full adders, and the number of gate stages is 14 at the maximum (see FIG. 9).

Figure 10:
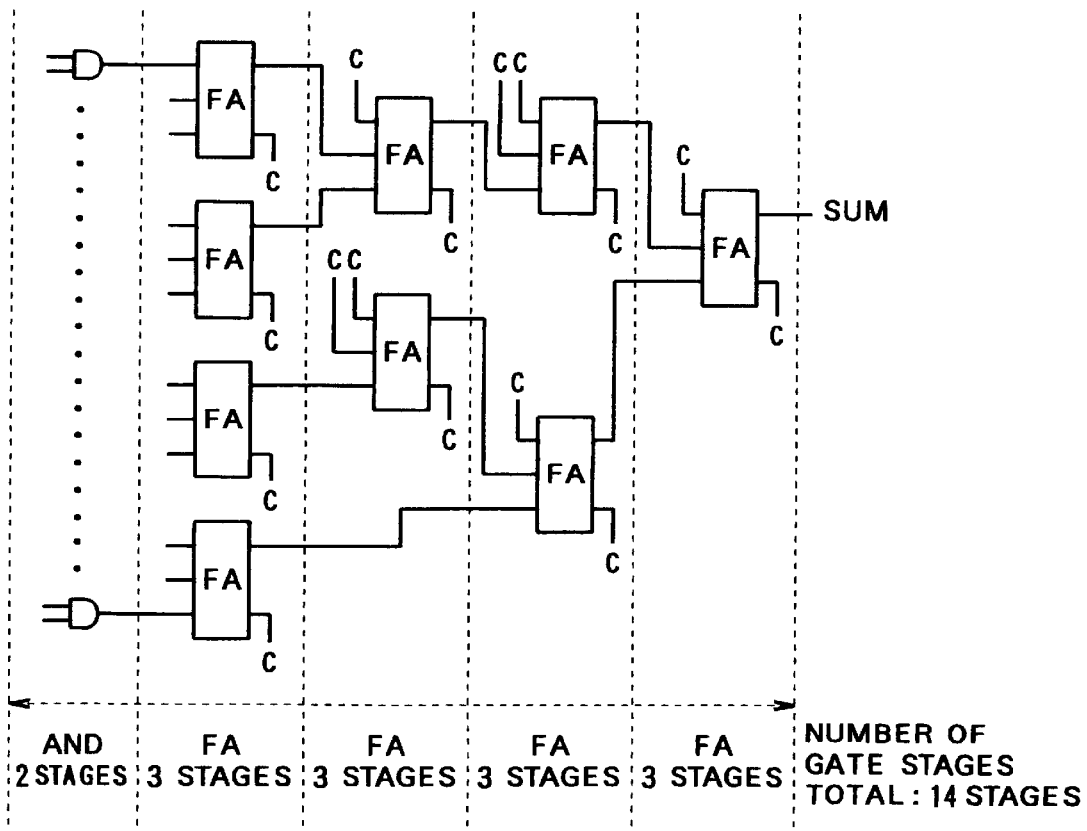
FIG. 10 is a block diagram of an embodiment of a partial product adder when the number of inputs is 12.

FIG. 10 shows an embodiment of a partial product adder wherein the number of inputs is 12. In this embodiment, the partial product adder comprises 9 full adders, and the number of gate stages is 14 at the maximum (see FIG. 10).

When the number of inputs is 13, if one of 14 inputs, which have not been connected to a ground power supply, is connected to the ground power supply in the partial product adder shown in FIG. 7, or if two of 15 inputs are connected to the ground power supply in the partial product adder shown in FIG. 7, and if the input(s) are set to be "0", the addition of partial products can be achieved.

Similarly, in the partial product adders shown in FIGS. 7 through 10, if some inputs are connected to the ground power supply and if these inputs are set to be "0", the addition of partial products can be achieved when the number of inputs is 4, 5, 6, 7, 8, 9, 10 and 11.

Therefore, in the 32-bit×32-bit multiplication, the number of gate stages in the addition of partial products can be 20 at the maximum by using the adder (multi-input adder) in this preferred embodiment for adding partial products.

On the other hand, in a conventional n-bit×n-bit array type parallel multiplier, it is required to provide n×n AND gates and n×(n−1) full adders, so that the number of gate stages in the whole multiplier is the sum of two stages of the AND gates and three stages×(n−1) of the full adders, i.e., 3n−1 stages.

Therefore, in the 32-bit×32-bit multiplier, the outputs pass through 95 (=3×32−1) stages of gates at the maximum.

As described above, if the adder (multi-input adder) in this preferred embodiment is used for adding partial products, the number of gate stages can be considerably reduced in comparison with the conventional case, so that acceleration can be achieved.

Figure 11:
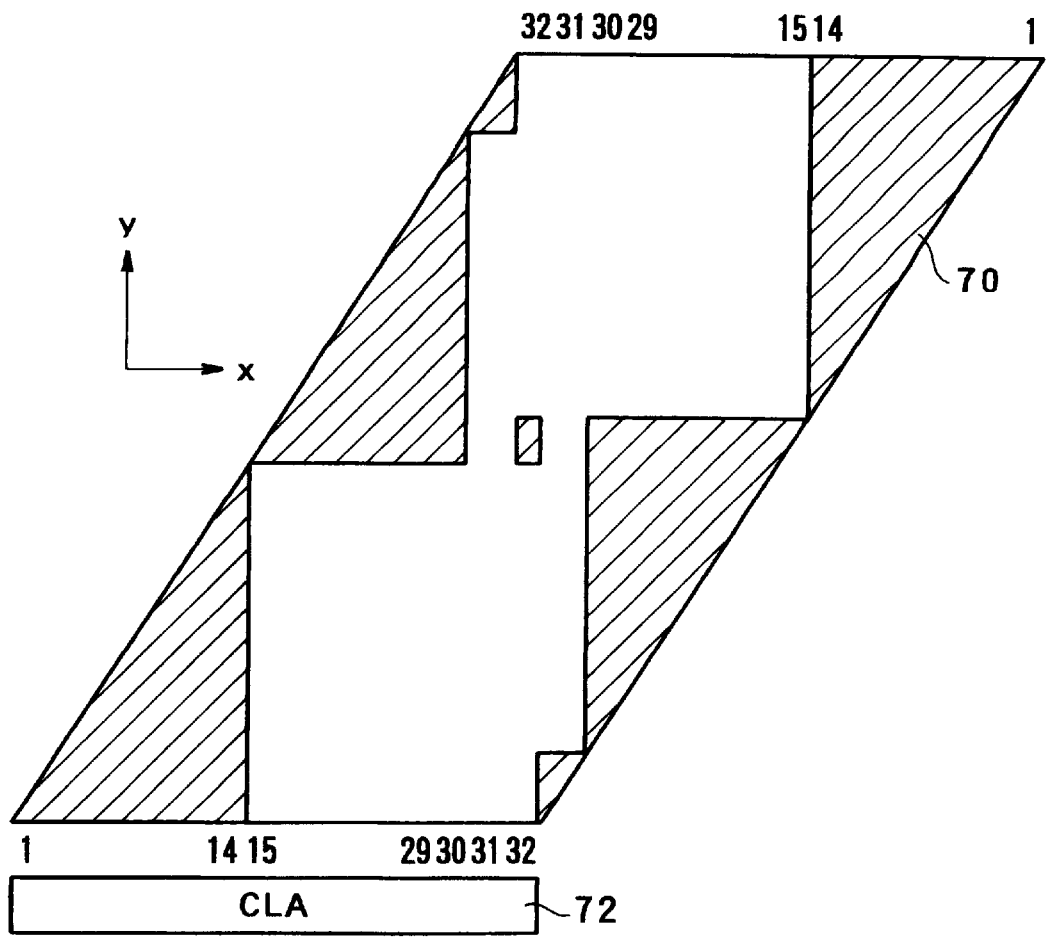
FIG. 11 is a schematic diagram of an example of a partial product array when an adder according to the present invention is used for adding partial products in multiplication of 32 bits×32 bits.
Figure 12:
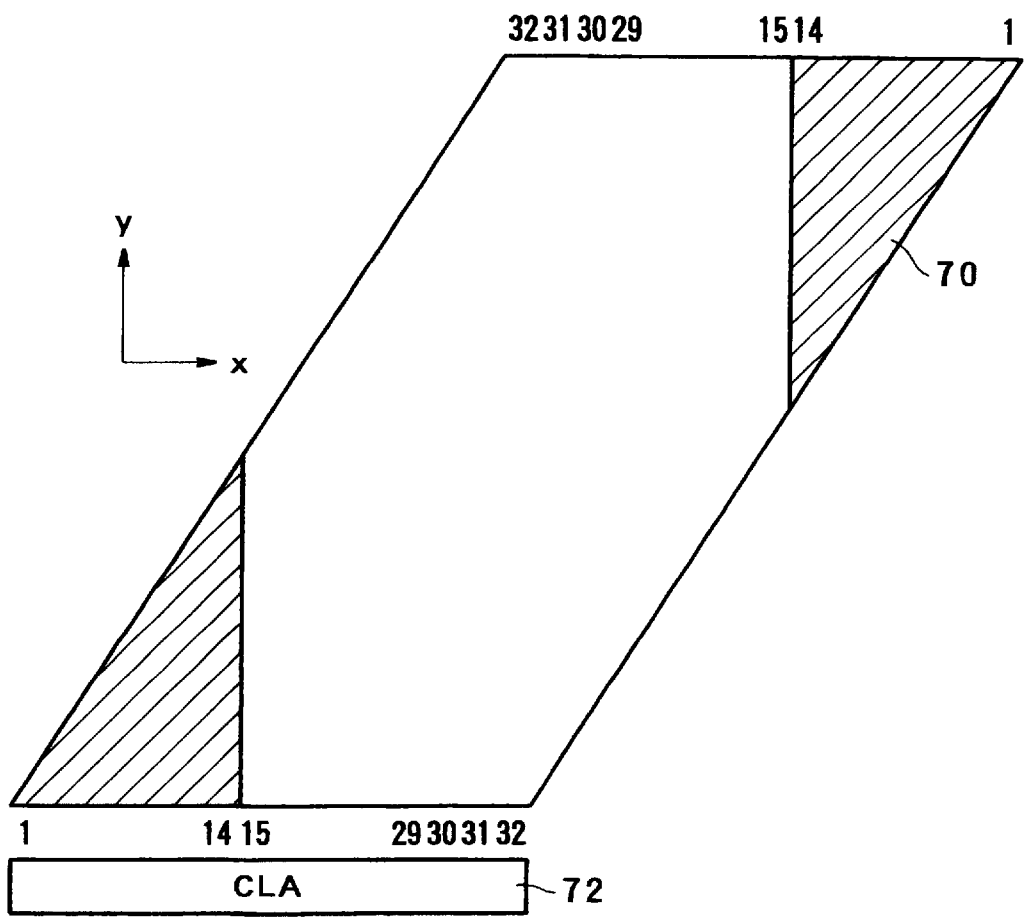
FIG. 12 is a schematic diagram of another example of a partial product array when an adder according to the present invention is used for adding partial products in multiplication of 32 bits×32 bits.

Furthermore, in the 32-bit×32-bit multiplication, if the adder in this preferred embodiment is combined with a full adder for adding partial products at the same place of a blank portion (a region in which the number (the number of bits) of partial products at the same place is 15 or more) of a partial product array 70 as shown in FIGS. 11 and 12, and if the partial product adder shown in FIGS. 7 through 10 is used for adding partial products in a slanting line portion (a region in which the number of partial products at the same place is 14 or less), the number of gate stages can be 20 or less. In this case, a carry look ahead (CLA) type adder 72 may be used for the addition in the final stage.

Furthermore, each of FIGS. 11 and 12 is a schematic diagram of the partial product array in the 32-bit×32-bit multiplication. In this partial product array 70, the numerals described in x-axis direction denote the number of partial products (partial products at the same place arranged in y-axis direction of the numerals.

Furthermore, in place of the ROM 6 of the adder in this preferred embodiment, a non-volatile memory, such as $E^2PROM$, may be used.

As described above, according to the present invention, the addition of a plurality of bits can be achieved at high speed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An adder comprising:

comparing means for comparing values of n input signals, each of which comprises 1-bit data, with first to n-th predetermined values which are different from each other;

a non-volatile memory having first to n+1-th word lines, m ($2^m \geq n+1$) bit lines which are provided so as to intersect said word lines, and memory cells, each of which is provided at an intersection of each of said word lines and each of said bit lines and each of which has stored 1-bit data; and selecting means for selecting one of said n+1 word lines on the basis of n comparison results of said comparing means to activate the selected word line, wherein said i-th (i=1, . . . , n) predetermined value is greater than i−1 and less than i, and said comparing means has first to n-th comparators, said i-th (i=1, . . . , n) comparator determining whether the number of input signals having a truth value of 1 out of said n input signals exceeds said first predetermined value, and outputting a i-th comparison result indicative signal, and said selecting means selecting one of said word lines on the basis of said first to n-th comparison result indicative signals, and wherein said selecting means has a first inverting gate for inverting said first comparison result indicative signal to output an inverted signal to said first word line, and a second inverting gate for inverting the inverted signal of said n-th comparison result indicative signal to output an inverted signal to said n+1-th word line, and said i-th (i=1, . . . , n−1) NOR gate carries out a NOR operation on the basis of said inverted signal of said i-th comparison result indicative signal and said i+1-th comparison result indicative signal to output an operation result to said i+1-th word line.

2. An adder comprising:

comparing means for comparing values of n input signals, each of which comprises 1-bit data, with first to n-th predetermined values which are different from each other;

a non-volatile memory having first to n+1-th word lines, m ($2^m \geq n+1$) bit lines which are provided so as to intersect said word lines, and memory cells, each of which is provided at an intersection of each of said word lines and each of said bit lines and each of which has stored 1-bit data; and selecting means for selecting one of said n+1 word lines on the basis of n comparison results of said comparing means to activate the selected word line, wherein said i-th (i=1, . . . , n) predetermined value is greater than i−1 and less than i, and said comparing means has first to n-th comparators, said i-th (i=1, . . . , n) comparator determining whether the number of input signals having a truth value of 1 out of said n input signals exceeds said first predetermined value, and outputting a i-th comparison result indicative signal, and said selecting means selecting one of said word lines on the basis of said first to n-th comparison result indicative signals, and wherein said i-th (i=1, . . . , n) comparator comprises:
first and second transistors of a first conductive type, each of said first and second transistors having a source, to which a first power supply voltage is applied;

a third transistor of a second conductive type which is different from said first conductive type, said third transistor having a drain connected to a drain of said first transistor, and a gate connected to a gate of said first transistor and a drain of said second transistor;

a fourth transistor of said second conductive type, said fourth transistor having a drain connected to said drain of said second transistor, and a gate connected to a gate of said second transistor and said drain of said first transistor;

a fifth transistor of said second conductive type, said fifth transistor having a source connected to a second power supply voltage which is different from said first power supply voltage, and a gate for receiving an enable signal from the outside;

a first transistor group including i transistors of said second conductive type, which are connected in parallel between a source of said third transistor and a drain of said fifth transistor, each of said i transistors having a gate, to which said first power supply voltage is applied; and a second transistor group including n transistors of said second conductive type, which are connected in parallel between a source and said fourth transistor and said drain of said fifth transistor, and wherein a j-th (j=1, . . . ,n) input signal out of said n input signals is applied to a gate of a j-th transistor of said second transistor group, each of said n transistors of said second transistor group having the same current driving ability, if i=1, one of said i transistors of said first transistor group having a current driving ability which is less than that of each of said n transistors of said second transistor group, if i≠1, each of transistors other than said one of said i transistors of said first transistor group having a current driving ability which is equal to that of each of said n transistors of said second transistor group and which is greater than that of said one of said i transistors of said first transistor group, and said i-th comparison result indicative signal being outputted from said drain of said first transistor, and an inverted signal of said i-th comparison result indicative signal being outputted from said drain of said second transistor.

3. A multiplier including at least one adder comprising:

comparing means for comparing values of n input signals, each of which comprises 1-bit data, with first to n-th predetermined values which are different from each other;

a non-volatile memory having first to n+1-th word lines, m ($2^m \geq n+1$) bit lines which are provided so as to intersect said word lines, and memory cells, each of which is provided at an intersection of each of said word lines and each of said bit lines and each of which has stored 1-bit data; and selecting means for selecting one of said n+1 word lines on the basis of n comparison results of said comparing means to activate the selected word line, and wherein said adder is used for adding partial products at the same place, said i-th (i=1, . . . , n) predetermined value is greater than i−1 and less than i, and comparing means has first to n-th comparators, said i-th (i=1, . . . , n) comparator determining whether the number of input signals having a truth value of 1 out of said n input signals exceeds said first predetermined value, and outputting a i-th comparison result indicative signal, and said selecting means selecting one of said word lines on the basis of said first to n-th comparison result indicative signals, and wherein said selecting means has a first inverting gate for inverting said first comparison result indicative signal to output an inverted signal to said first word line, and a second inverting gate for inverting the inverted signal of said n-th comparison result indicative signal to output an inverted signal to said n+1-th word line, and said i-th (i=1, . . . , n−1) NOR gate carries out a NOR operation on the basis of said inverted signal of said i-th comparison result indicative signal and said i+1-th result indicative signal to output an operation result to said i+1-th word line.

4. A multiplier including at least one adder comprising:

comparing means for comparing values of n input signals, each of which comprises 1-bit data, with first to n-th predetermined values which are different from each other;

a non-volatile memory having first to n+1-th word lines, m ($2^m \geq n+1$) bit lines which are provided so as to intersect said word lines, and memory cells, each of which is provided at an intersection of each of said word lines and each of said bit lines and each of which has stored 1-bit data; and selecting means for selecting one of said n+1 word lines on the basis of n comparison results of said comparing means to activate the selected word line, and wherein said adder is used for adding partial products at the same place, said i-th (i=1, . . . , n) predetermined value is greater than i−1 and less than i, and comparing means has first to n-th comparators, said i-th (i=1, . . . , n) comparator determining whether the number of input signals having a truth value of 1 out of said n input signals exceeds said first predetermined value, and outputting a i-th comparison result indicative signal, and said selecting means selecting one of said word lines on the basis of said first to n-th comparison result indicative signals, and wherein said i-th (i=1, . . . , n) comparator comprises:
- first and second transistors of a first conductive type, each of said first and second transistors having a source, to which a first power supply voltage is applied;
- a third transistor of a second conductive type which is different from said first conductive type, said third transistor having a drain connected to a drain of said first transistor, and a gate connected to a gate of said first transistor and a drain of said second transistor;
- a fourth transistor of said second conductive type, said fourth transistor having a drain connected to said drain of said second transistor, and a gate connected to a gate of said second transistor and said drain of said first transistor;
- a fifth transistor of said second conductive type, said fifth transistor having a source connected to a second power supply voltage which is different from said first power supply voltage, and a gate for receiving an enable signal from the outside;
- a first transistor group including i transistors of said second conductive type, which are connected in parallel between a source of said third transistor and a drain of said fifth transistor, each of said i transistors having a gate, to which said first power supply voltage is applied; and
- a second transistor group including n transistors of said second conductive type, which are connected in parallel between a source and said fourth transistor and said drain of said fifth transistor, and wherein a j-th (j=1, . . . , n) input signal out of said n input signals is applied to a gate of a j-th transistor of said second transistor group, each of said n transistors of said second transistor group having the same current driving ability, if i=1, one of said i transistors of said first transistor group having a current driving ability which is less than that of each of said n transistors of said second transistor group, if i≠1, each of transistors other than said one of said i transistors of said first transistor group having a current driving ability which is equal to that of each of said n transistors of said second transistor group and which is greater than that of said one of said i transistors of said first transistor group, and said i-th comparison result indicative signal being outputted from said drain of said first transistor, and an inverted signal of said i-th comparison result indicative signal being outputted from said drain of said second transistor.

* * * * *